(12) United States Patent
Kim et al.

(10) Patent No.: US 7,921,347 B2
(45) Date of Patent: Apr. 5, 2011

(54) METHOD AND APPARATUS FOR PERFORMING AUTOMATIC RETRANSMISSION REQUEST IN A MOBILE COMMUNICATION SYSTEM

(75) Inventors: Seong-Hun Kim, Suwon-si (KR); Gert-Jan Van Lieshout, Staines (GB); Himke Van Der Velde, Staines (GB)

(73) Assignee: Samsung Electronics Co., Ltd. (KR)

( * ) Notice: Subject to any disclaimer, the term of this patent is extended or adjusted under 35 U.S.C. 154(b) by 1019 days.

(21) Appl. No.: 11/787,411

(22) Filed: Apr. 16, 2007

(65) Prior Publication Data

US 2007/0280193 A1  Dec. 6, 2007

(30) Foreign Application Priority Data

Apr. 14, 2006  (KR) ................. 10-2006-0033965

(51) Int. Cl.
*H04L 1/18* (2006.01)
(52) U.S. Cl. ..................... 714/749; 714/774
(58) Field of Classification Search .......... 714/749, 714/774
See application file for complete search history.

(56) References Cited

U.S. PATENT DOCUMENTS

| | | | |
|---|---|---|---|
| 5,574,979 A * | 11/1996 | West | 455/63.1 |
| 5,844,918 A * | 12/1998 | Kato | 714/751 |
| 6,697,988 B2 | 2/2004 | Kim et al. | |
| 6,947,394 B1 | 9/2005 | Johansson et al. | |
| 7,054,316 B2 * | 5/2006 | Cheng et al. | 370/394 |
| 7,499,417 B2 * | 3/2009 | Kim et al. | 370/310 |
| 7,719,991 B2 * | 5/2010 | Bhushan et al. | 370/252 |
| 2002/0080792 A1 | 6/2002 | Rosier | |
| 2002/0093937 A1 | 7/2002 | Kim et al. | |
| 2002/0191544 A1 * | 12/2002 | Cheng et al. | 370/236 |
| 2003/0123389 A1 * | 7/2003 | Russell et al. | 370/230 |
| 2004/0147236 A1 | 7/2004 | Parkvall et al. | |

FOREIGN PATENT DOCUMENTS

| | | |
|---|---|---|
| EP | 1 843 504 | 10/2007 |
| KR | 1020010064867 | 7/2001 |
| KR | 1020020003233 | 1/2002 |

OTHER PUBLICATIONS

Kueh et al., Enhancing the Radio Link Protocol for VoIP Session Establishment Signaling Over Satellite-UMTS, 2004 IEEE.

* cited by examiner

*Primary Examiner* — M. Mujtaba K Chaudry
(74) *Attorney, Agent, or Firm* — The Farrell Law Firm, P.C.

(57) ABSTRACT

A method and an apparatus are provided for performing Automatic Retransmission reQuest (ARQ) in a mobile communication system including an ARQ layer and a Hybrid ARQ (HARQ) layer. The method includes receiving from an ARQ receiving (Rx) entity a status report indicating a reception status of ARQ packets; detecting an ARQ packet having a transmission completion time going ahead of a generation time of the status report, among the ARQ packets whose transmission was completed by an ARQ transmitting (Tx) entity; and retransmitting an ARQ packet not ACK/NACK-ed by the status report, among the detected ARQ packets.

10 Claims, 7 Drawing Sheets

METHOD AND APPARATUS FOR PERFORMING AUTOMATIC RETRANSMISSION REQUEST IN A MOBILE COMMUNICATION SYSTEM

PRIORITY

This application claims priority under 35 U.S.C. §119(a) to a Korean Patent Application filed in the Korean Intellectual Property Office on Apr. 14, 2006 and assigned Serial No. 2006-33965, the disclosure of which is incorporated herein by reference.

BACKGROUND OF THE INVENTION

1. Field of the Invention

The present invention relates generally to a mobile communication system, and in particular, to a method and apparatus in which an Automatic Retransmission reQuest (ARQ) transmitting (Tx) entity recognizes a transmission failure that an ARQ receiving (Rx) entity has failed to recognize, and automatically retransmits a data packet.

2. Description of the Related Art

A Universal Mobile Telecommunication Service (UMTS) system is a $3^{rd}$ Generation (3G) asynchronous mobile communication system that is based on Global System for Mobile Communications (GSM) and General Packet Radio Services (GPRS), both of which are European mobile communication systems, and uses Wideband Code Division Multiple Access (WCDMA).

In $3^{rd}$ Generation Partnership Project (3GPP), which is in charge of UMTS standardization, Long Term Evolution (LTE) is being discussed as the next generation mobile communication system of the UMTS system. LTE, aimed deployment in around 2010, is a technology for implementing high-speed packet based communication at about 100 Mbps. As such, several schemes are under discussion, and the schemes under discussion include one scheme of reducing the number of nodes located in a communication path by simplifying the network configuration, and another scheme of maximally approaching wireless protocols to wireless channels.

FIG. 1 illustrates an exemplary configuration of an Evolved UMTS mobile communication system.

In FIG. 1, a configuration of Evolved UMTS Radio Access Networks (E-UTRANs or E-RANs) 110 and 112 is simplified to a 2-node configuration of Evolved Node Bs (ENBs or Node Bs) 120, 122, 124, 126 and 128, and anchor nodes 130 and 132. A User Equipment (UE) 101 accesses an Internet Protocol (IP) network by the E-RAN 135 and 140. The anchor nodes 130 and 132 are denoted by Evolved Gateway GPRS Serving Node (EGGSN). A User Equipment (UE) 101 accesses an Internet Protocol (IP) network by the E-RANs 110 and 112.

The ENBs 120 to 128, nodes corresponding to the existing Node Bs of the UMTS system, are connected to the UE 101 over a wireless channel. Compared with the existing Node Bs, the ENBs 120 to 128 perform more complex functions. In LTE, all user traffics, including real-time services such as Voice over IP (VoIP) service, are serviced over a shared channel. This means that there is a need for an apparatus for collecting status information of UEs and performing scheduling depending thereon. The scheduling is managed by the ENBs 120 to 128.

In LTE, like in High Speed Downlink Packet Access (HS-DPA) or Enhanced Uplink Dedicated Channel (EDCH), Hybrid ARQ (HARQ) is performed between the ENBs 120 to 128 and the UE 101. However, with use of only the HARQ, LTE cannot satisfy various Quality of Service (QoS) requirements. Therefore, a separate ARQ (or outer-ARQ) can be performed in an upper layer, and the outer-ARQ is also performed between the ENBs 120 to 128 and the UE 101.

In this case, LTE will use Orthogonal Frequency Division Multiplexing (OFDM) as wireless access technology in a 20-MHz bandwidth in order to realize a data rate of a maximum of 100 Mbps. In addition, LTE will employ Adaptive Modulation & Coding (AMC) that determines a modulation scheme and a channel coding rate according to channel status of UEs. Many mobile communication systems now under discussion, including LTE, use both HARQ and ARQ as an error correction technique.

HARQ is a technique for soft-combining previously received data with retransmitted data without discarding the previously received data, thereby increasing a reception success rate. More specifically, an HARQ receiving (Rx) entity determines presence/absence of error in a received packet, and sends an Acknowledged (ARQ ACK) signal or a Non-Acknowledged (ARQ NACK) signal to an HARQ transmitting (Tx) entity according to the presence/absence of error. The HARQ Tx entity performs retransmission of the HARQ packet or transmission of a new HARQ packet according to the HARQ ACK/NACK signal. The HARQ Rx entity soft-combines a retransmitted packet with a previously received packet, thereby reducing an error rate.

However, ARQ, a technique for checking a sequence number of a received packet and sending a retransmission request for a missing packet using a status report, does not soft-combine a previously received packet with a retransmitted packet.

Because both ARQ and HARQ have a function of recovering erroneous packets, it is considered that there is no need to perform ARQ and HARQ together. However, because a sufficiently low packet error ratio cannot be obtained with use of only HARQ, ARQ and HARQ should be performed together in most packet services. In HARQ, because an HARQ ACK/NACK signal is a 1-bit feedback signal, it is difficult to reduce an error rate of the feedback signal through channel coding. Therefore, it is hard to achieve a low packet error rate with use of only HARQ. If an HARQ NACK signal is misrecognized as an HARQ ACK signal, the corresponding packet is completely lost in the HARQ layer. Therefore, reliability of the HARQ ACK/NACK signal acts as an important factor in determining a packet error ratio in the HARQ layer.

An ARQ operation determines an ARQ packet corresponding to a gap among sequence numbers, as a missing packet (or lost packet), and issues a retransmission request for the missing packet. However, when the last packet is lost, there is no gap among the sequence numbers. Therefore, the ARQ Rx entity cannot issue a retransmission request for the last packet. Accordingly, there is a need for a technique for performing fast retransmission even when the last packet is lost in the mobile communication system where both ARQ and HARQ operate together.

SUMMARY OF THE INVENTION

An aspect of the present invention is to substantially solve at least the above problems and/or disadvantages and to provide at least the advantages described below. Accordingly, one aspect of the present invention is to provide a method and apparatus for automatically performing retransmission of the last packet using information from an HARQ level when the last packet of an ARQ level is lost in a mobile communication system supporting both ARQ and HARQ.

According to one aspect of the present invention, there is provided a method for performing Automatic Retransmission reQuest (ARQ) in a mobile communication system including an ARQ layer and a Hybrid ARQ (HARQ) layer. The method includes receiving from an ARQ receiving (Rx) entity a status report indicating a reception status of the ARQ packets; detecting an ARQ packet having a transmission completion time going ahead of a generation time of the status report, among the ARQ packets whose transmission was completed by an ARQ transmitting (Tx) entity; and retransmitting an ARQ packet not ACK/NACK-ed by the status report, among the detected ARQ packets.

According to another aspect of the present invention, there is provided an apparatus for performing Automatic Retransmission reQuest (ARQ) in a mobile communication system including an ARQ layer and a Hybrid ARQ (HARQ) layer. The apparatus includes a framing unit for generating ARQ packets by framing a packet from an upper layer; a retransmission buffer for storing copies of the ARQ packets for transmission thereof; a multiplexer for multiplexing the ARQ packets into an HARQ packet; an HARQ processor for transmitting the HARQ packet according to an HARQ process, and recording a transmission completion time of the HARQ packet; a transceiver for modulating the HARQ packet into a radio signal before transmission, and demodulating the HARQ packet, received from an ARQ receiving (Rx) entity, including a status report indicating a reception status of the ARQ packets; and a controller for detecting an ARQ packet having a transmission completion time going ahead of a generation time of the status report, among the ARQ packets stored in the retransmission buffer, and controlling the retransmission buffer so as to output an ARQ packet not ACK/NACK-ed by the status report, among the detected ARQ packets.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness.

In the next generation mobile communication system including both an ARQ entity and an HARQ entity, the present invention compares the time an ACK signal was generated with the time the transmission of a data packet has been successfully completed, and selectively performs retransmission of the data packet according to the comparison result. Although the configurations and terms of the asynchronous UMTS system will be used in the following description of the present invention, it will be understood by those skilled in the art that a novel ARQ process of the present invention can be applied to other mobile communication systems having the similar technical backgrounds and channel formats without departing from the spirit and scope of the invention.

Figure 1:
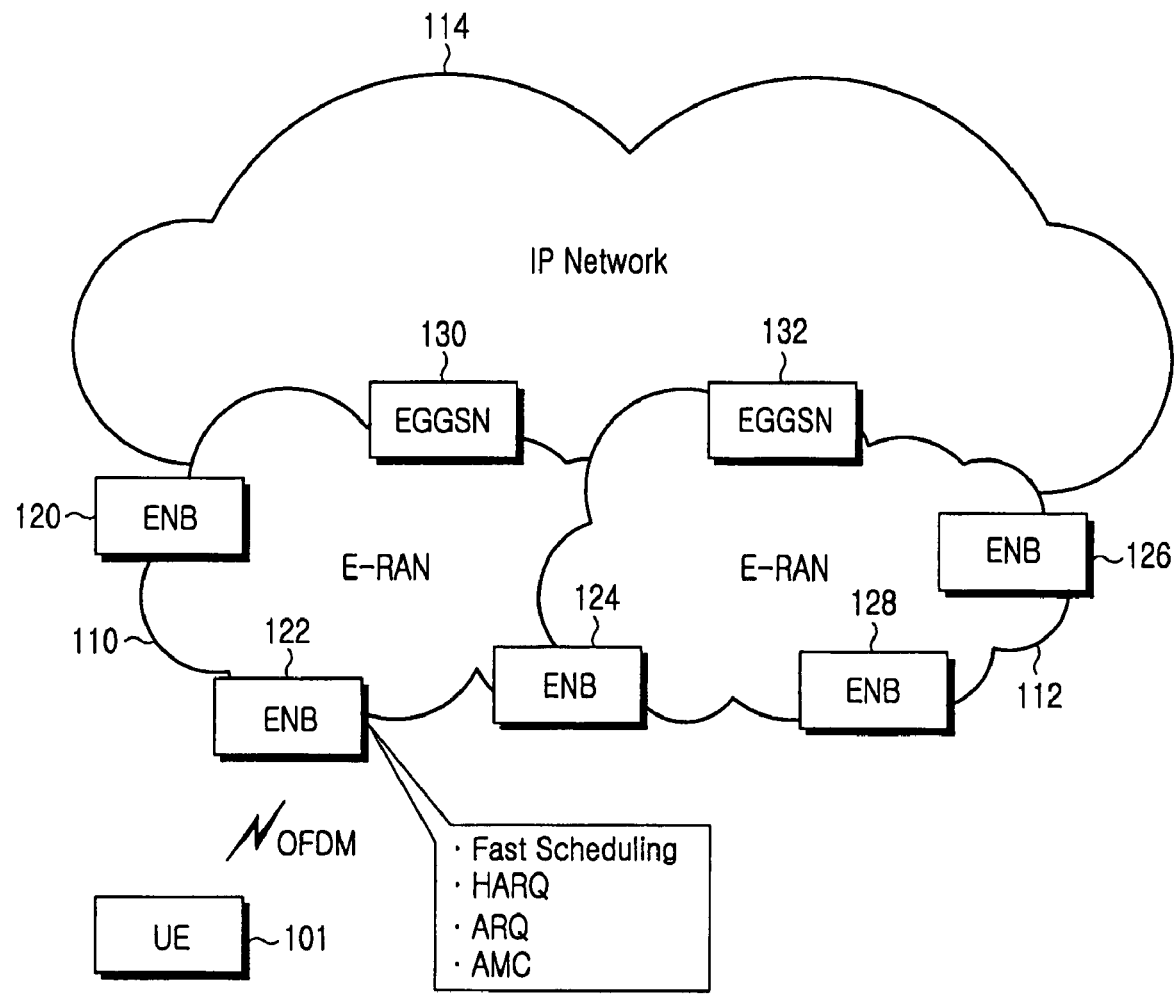
FIG. 1 is a diagram illustrating an exemplary configuration of a next generation mobile communication system.
Figure 2:
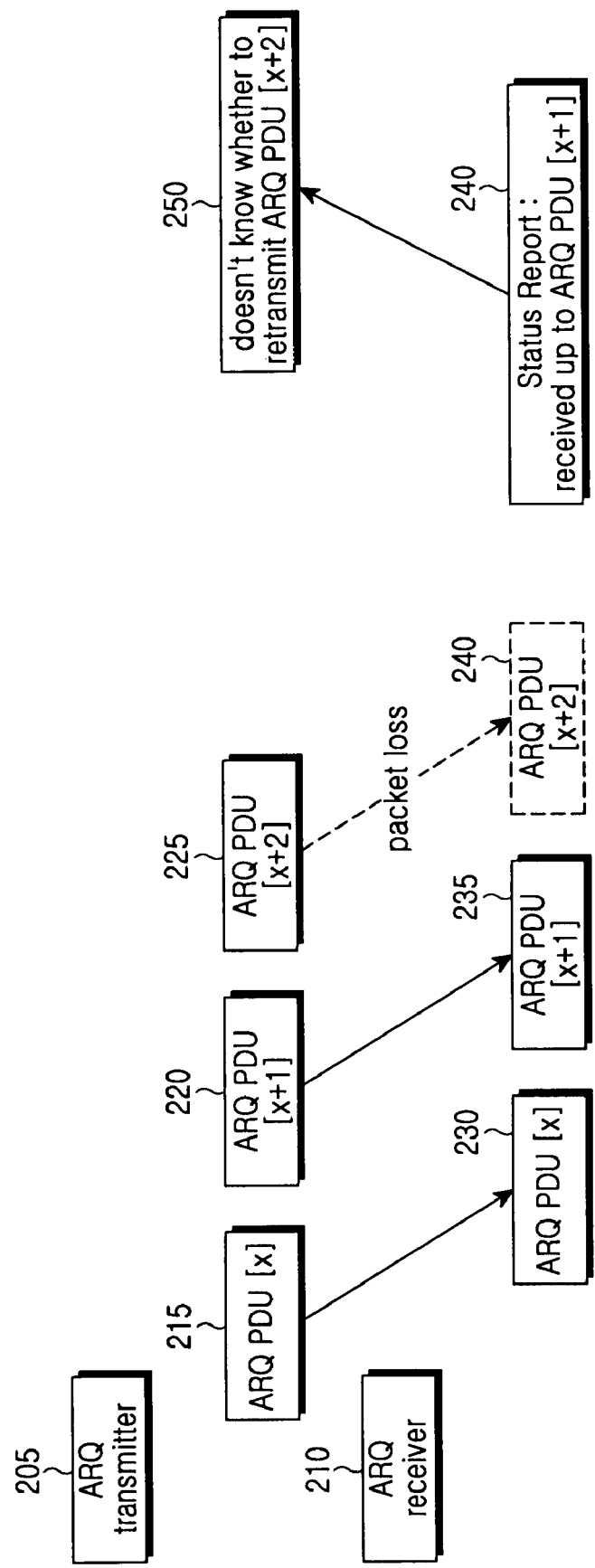
FIG. 2 is a diagram illustrating an example of an ARQ operation in a mobile communication system according to a preferred embodiment of the present invention.

FIG. 2 illustrates an example of an ARQ operation in a mobile communication system according to a preferred embodiment of the present invention. In a system supporting both ARQ and HARQ, ARQ and HARQ are generally implemented in different protocol layers, and HARQ requiring soft combining is generally included in a lower protocol layer.

In FIG. 2, an ARQ transmitting (Tx) entity 205 transmits Protocol Data Units (PDUs) 215, 220 and 225 with sequence numbers [x] to [x+2] to an ARQ receiving (Rx) entity 210. For convenience, an ARQ PDU with a sequence number [x] will be referred to herein as an ARQ PDU[x].

The ARQ Rx entity 210 has successfully received an ARQ PDU[x] 230 and an ARQ PDU[x+1] 235, but has failed to receive an ARQ PDU[x+2] 240. In addition, for some reason, the ARQ Rx entity 210 generates a status report 245. The status report 245 includes the sequence numbers of the ARQ PDUs successfully received at the ARQ Rx entity 210 up to the present time, and the sequence numbers of the reception-failed (or missing) ARQ PDUs. Herein, the sequence numbers of the successfully received ARQ PDUs substantially refer to the ACK signals for the corresponding ARQ PDUs. In addition, the reception-failed ARQ PDU refers to an ARQ PDU that the ARQ Rx entity 210 has failed to receive up to the time the status report 245 is generated, and it is considered that an ARQ PDU, whether or not it has been transmitted by the ARQ Tx entity 205 cannot be known, does not correspond to the reception-failed ARQ PDU.

The ARQ Rx entity 210 cannot perceive its failure to receive a certain ARQ PDU, until the ARQ Rx entity 210 receives an ARQ PDU succeeding the failed ARQ PDU. For example, the ARQ Rx entity 210 can perceive its failure to receive the ARQ PDU[x+2] 240 after the ARQ Rx entity 210 receives an ARQ PDU[x+3]. If the ARQ PDU[x+2] 240 is the last ARQ PDU stored in a transmission buffer (not shown) of the ARQ Tx entity 205, the status report 245 includes only the information indicating successful receipt of up to the ARQ PDU[x+1] 235, because the ARQ Rx entity 210 cannot perceive its failure to receive the ARQ PDU[x+2] 240. In this case, the ARQ Tx entity 205 receiving the status report 245 cannot perceive the need to retransmit the ARQ PDU[x+2].

In the ARQ operation that determines a missing ARQ PDU based on a gap among the sequence numbers, if the last ARQ PDU is lost, the ARQ Rx entity 210 sends no a NACK signal to the ARQ Tx entity 205, as ARQ Rx entity 210 cannot perceive the loss. In this case, therefore, the last ARQ PDU is utterly lost, without being retransmitted in an ARQ level. A preferred embodiment of the present invention solves this problem in an HARQ level.

Figure 3:
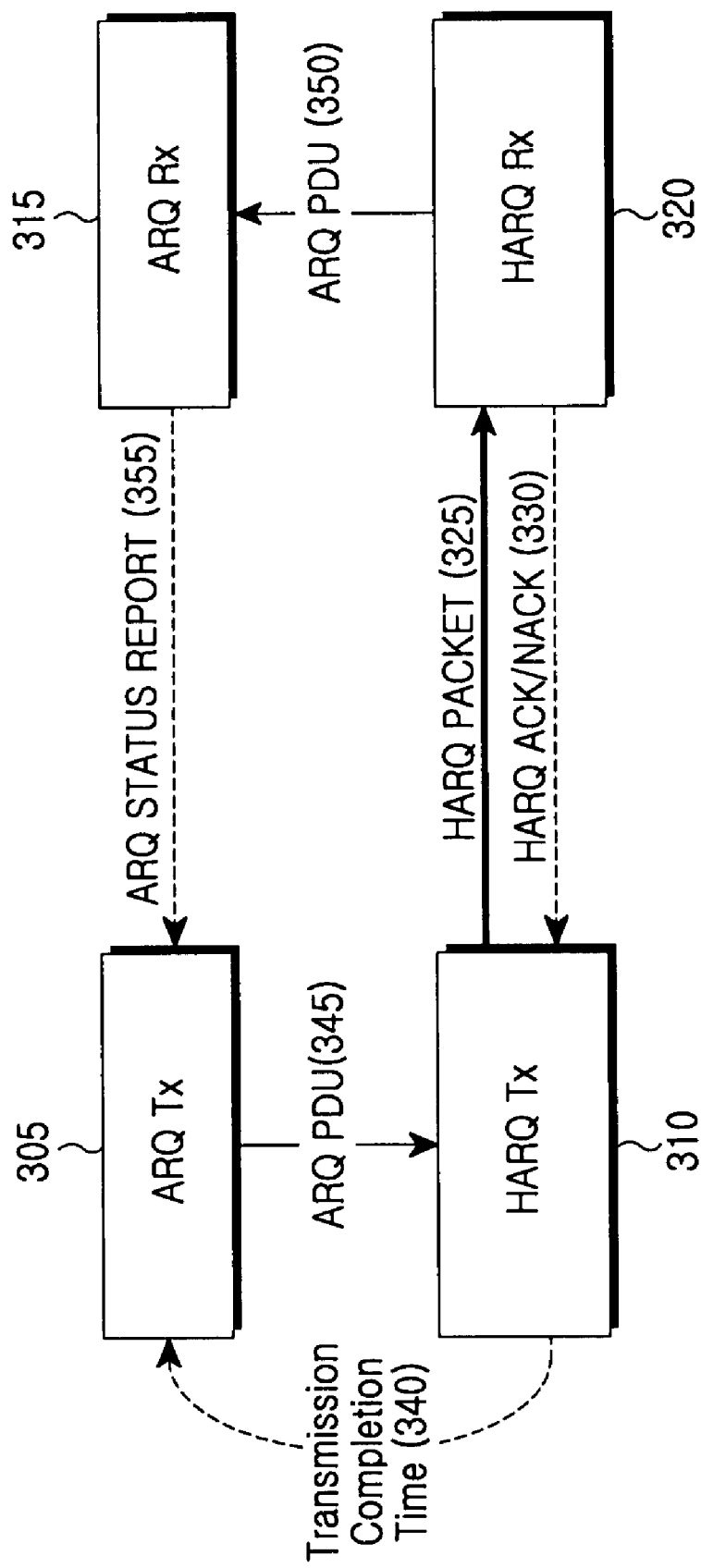
FIG. 3 is a block diagram schematically illustrating HARQ and ARQ processes according to a preferred embodiment of the present invention.

FIG. 3 schematically illustrates HARQ and ARQ process according to a preferred embodiment of the present invention. In 3GPP, a packet output from each protocol layer is generally referred to as a Protocol Data Unit (PDU). Thus, in the present invention, the terms 'packet' and 'PDU' will be used together.

In FIG. 3, an HARQ Tx entity 310 recognizes a transmission completion time 340 indicating the time the transmission of an HARQ packet 325 has been successfully completed. The transmission of the HARQ packet 325 containing an ARQ packet 345 transmitted by an ARQ Tx entity 305 is successfully completed when the HARQ Tx entity 310 receives an HARQ ACK 330 from an HARQ Rx entity 320. Therefore, the time the HARQ packet 325 that has caused the HARQ ACK 330 was transmitted is the time 340 at which the transmission of the HARQ packet 325 was completed. If the HARQ Tx entity 310 sends the transmission completion time 340 to the ARQ Tx entity 305, the ARQ Tx entity 305 recognizes that the transmission of the ARQ packet 345 contained in the HARQ packet 325 was successfully completed at the time 340.

When the ARQ Tx entity 305 receives from an ARQ Rx entity 315 a status report 355 generated at a time x after the transmission completion time 340, if the status report 355 includes no ACK signal for the ARQ packet 345, the ARQ Tx entity 305 determines that the transmission of the ARQ packet 345 has actually failed.

For example, though the time the HARQ transmission of the ARQ PDU[x+2] was successfully completed is '100', if a status report generated at a time '110' includes no ACK signal for the ARQ PDU[x+2], it means that the HARQ transmission of the ARQ PDU[x+2] has actually failed. Thus, the ARQ Tx entity retransmits the ARQ PDU[x+2], even though the status report includes no NACK signal for the ARQ PDU[x+2], i.e. even though the status report includes no retransmission request for the ARQ PDU[x+2]. Likewise, in the case where there are multiple ARQ packets that have succeeded in HARQ transmission before generation of a status report, if the ARQ packets were not ACK-ed by the status report, the ARQ Tx entity determines to retransmit the ARQ packets.

The foregoing event occurs when the HARQ Tx entity 310 misrecognizes its transmission failure for an HARQ packet 325 as a transmission success. For example, the event occurs when an HARQ NACK signal is misrecognized as an HARQ ACK signal.

A brief description will now be made of the overall process according to a preferred embodiment of the present invention.

1. The HARQ Tx entity 310 provides the ARQ Tx entity 305 with information on the time 340 (or transmission completion time) at which the transmission of the HARQ packet 325 was successfully completed.

2. The ARQ Tx entity 305 recognizes the transmission completion time 340 as the time the transmission of the ARQ packet 345 contained in the HARQ packet 325 was completed.

3. If a predetermined condition is satisfied, the ARQ Rx entity 315 generates the status report 355 and sends it to the ARQ Tx entity 305. The status report 355 writes a reception status of ARQ packets received up to the time the status report 355 was generated. That is, the status report 355 writes the sequence numbers of the ARQ packets successfully received (i.e. ACK-ed) up to the time the status report 355 was generated, and the sequence numbers of the retransmission-requested (i.e. NACK-ed) ARQ packets. The ARQ Rx entity 315 can write, in the status report 355, information on the time the status report 355 was generated.

4. Upon receipt of the status report 355, the ARQ Tx entity 305 checks a generation time of the status report 355, and then performs retransmission even though the status report 355 has no retransmission request for the ARQ packets, thereby recognizing that the ARQ Tx entity 305 has failed in transmission of the ARQ packets not ACK-ed by the status report 355, among the ARQ packets whose transmission was successfully completed at an arbitrary time before the generation time of the status report 355.

The terms 'time' used throughout the specification will now be described in more detail.

The present invention uses multiple 'times' that should be equally recognized by a UE and an ENB, like the 'status report generation time' and 'transmission completion time'. As the simplest way of allowing an index indicating a certain time to have the same meaning between two nodes, the UE and the ENB include timers synchronized with each other. However, in general mobile communication, the UE uses the system time broadcasted by the ENB, rather than using the individual synchronized timers.

In mobile communication, a frame is used as a time unit. The frame means a period (or time) used as a basic unit for transmission/reception. For example, in UMTS, a one-frame length is 10 msec. In the conventional mobile communication system, like in UMTS, the ENB includes a timer (or counter) that increases by 1 at every frame boundary. The timer increases by 1 every 10 msec, and the timer starts at the initiation of the frame. An output of the timer, which increases by 1 at every frame boundary, is called a frame number. As the ENB periodically broadcasts the frame number, the UE and the ENB can identify a frame number of a specific frame.

Therefore, the frame number broadcasted by the ENB can be used as the 'time' used throughout the specification. For example, the status report generation time can be replaced with a frame number of the frame at which a status report was generated, and the transmission completion time can be replaced with a frame number of the frame at which transmission of a packet was completed.

Specifically, the frame number can have a hierarchical structure. For example, in the LTE system, because a transmission/reception unit has a short period (or time) of 0.5 msec, the system uses a period longer than 10 msec as a unit of a frame and can use 0.5 msec as a unit of a sub-frame. That is, in a system where one frame having a 10-msec length is composed of 20 sub-frames having a 0.5-msec length, a combination of a frame number and a sub-frame number can be used as an index of time. For example, a time 2505.11 means a sub-frame #11 in a frame #2505.

Figure 4:
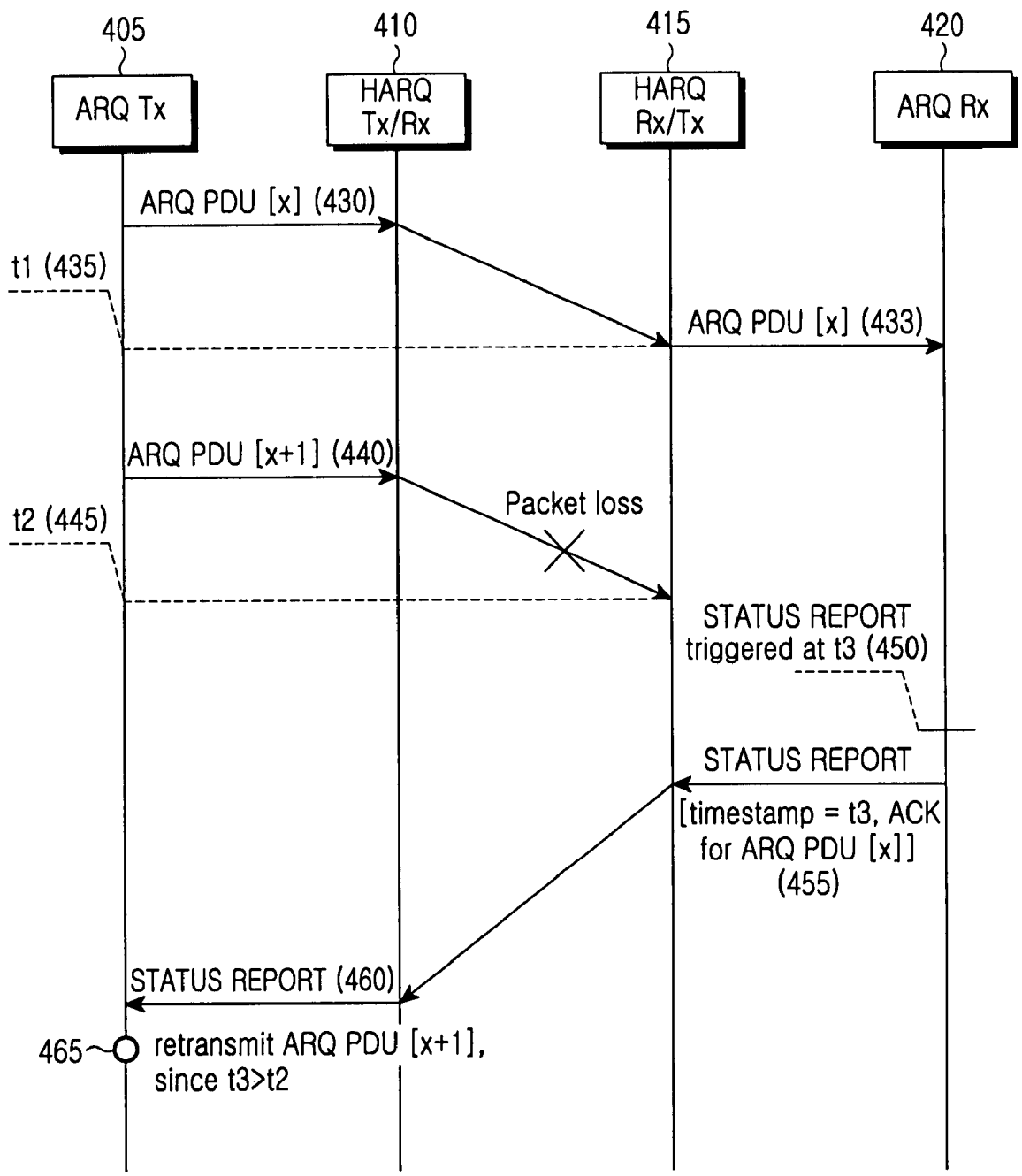
FIG. 4 is a flow diagram illustrating the overall process according to a preferred embodiment of the present invention.

FIG. 4 illustrates the overall process according to a preferred embodiment of the present invention. As illustrated, in a communication system including an ARQ Tx entity 405, an HARQ Tx entity (or HARQ Tx/Rx entity) 410, an HARQ Rx entity (or HARQ Rx/Tx entity) 415, and an ARQ Rx entity 420, ARQ packets are exchanged between the ARQ Tx entity 405 and the ARQ Rx entity 420.

In FIG. 4, the ARQ Tx entity 405 delivers in step 430 an ARQ PDU[x] to the HARQ Tx entity 410 and the ARQ PDU[x] is transmitted from the HARQ Tx entity 410 to the HARQ Rx entity 415 through an HARQ process. In step 433, the HARQ Rx entity 415 delivers the ARQ PDU[x] to the ARQ Rx entity 420.

In the HARQ process, the HARQ Tx entity 410 recognizes the time the transmission of an HARQ packet including the ARQ packet was completed, and sends information on the time (i.e. transmission completion time) at which the transmission of the HARQ packet was completed, to the ARQ Tx entity 405. The ARQ Tx entity 405 has previously recognized the relationship between an ARQ packet and an HARQ packet containing the ARQ packet, and recognizes a transmission completion time of the ARQ packet based on the transmission completion time of the HARQ packet. For example, a transmission completion time of an ARQ PDU[x]

is equal to a time t1 435 at which transmission of an HARQ packet containing the ARQ PDU[x] was completed.

Thereafter, the ARQ Tx entity 405 delivers in step 440 an ARQ PDU[x+1] to the HARQ Tx entity 410, and the ARQ PDU[x+1] is transmitted to the HARQ Rx entity 415 through an HARQ process. In step 443, an event occurs in which, an HARQ packet containing the ARQ PDU[x+1] has failed to be received at the HARQ Rx entity 415, but the HARQ Tx entity 410 misrecognizes (misconceives) that the HARQ packet has been normally transmitted. The event occurs, for example, when the HARQ Tx entity 410 misrecognizes an HARQ NACK from the HARQ Rx entity 415 as an HARQ ACK, or when the HARQ Tx entity 410 has received an HARQ ACK signal for the ARQ PDU[x+1] even though the HARQ Rx entity 415 has sent no feedback signal (ACK or NACK).

Therefore, the HARQ Tx entity 410 delivers the transmission completion time of the HARQ packet to the ARQ Tx entity 405, misrecognizing that the transmission of the HARQ packet has been successfully made. If the time the HARQ Tx entity 410 has misrecognized that the transmission of the HARQ packet containing the ARQ PDU[x+2] was completed is, for example, a time t2 445, the ARQ Tx entity 405 records the time t2 445 as a transmission completion time of the ARQ PDU[x+2].

Thereafter, at a time t3 450, as a predetermined condition is satisfied, the ARQ Rx entity 420 triggers (or generates) a status report. The ARQ Rx entity 420 contains, in the status report, reception status information of the ARQ packets received up to the time t3 450. That is, the status report contains an ACK signal indicating sequence numbers for the ARQ packets normally received up to the time the status report was generated, and a NACK signal indicating sequence numbers for the reception-failed ARQ packets. The ARQ Rx entity 420, as it has normally received up to the ARQ PDU[x], contains an ACK signal for the ARQ PDU[x] in the status report. In addition, the ARQ Rx entity 420 can contain in the status report a timestamp indicating the time t3 at which the status report was generated.

In step 455, the status report is delivered to the HARQ Rx entity 415, and the HARQ Rx entity 415 transmits an HARQ packet containing the status report to the HARQ Tx entity 410 through an HARQ process. In step 460, upon successfully receiving the HARQ packet, the HARQ Tx entity 410 delivers the status report contained in the HARQ packet to the ARQ Tx entity 405.

In step 465, the ARQ Tx entity 405 checks the generation time t3 of the status report, and determines whether the ACK signals for the ARQ packets, whose transmission was completed before the generation time, are included in the status report. In addition, the ARQ Tx entity 405 retransmits the ARQ packets not ACK-ed in the status report, among the ARQ packets whose transmission was completed before the generation time of the status report.

In the foregoing example, because the transmission completion time t2 445 of the ARQ PDU[x+1] goes ahead of the status report generation time t3 450 and an ACK signal for the ARQ PDU[x+1] is not included in the status report, the ARQ Tx entity 405 retransmits the ARQ PDU[x+1].

Figure 5:
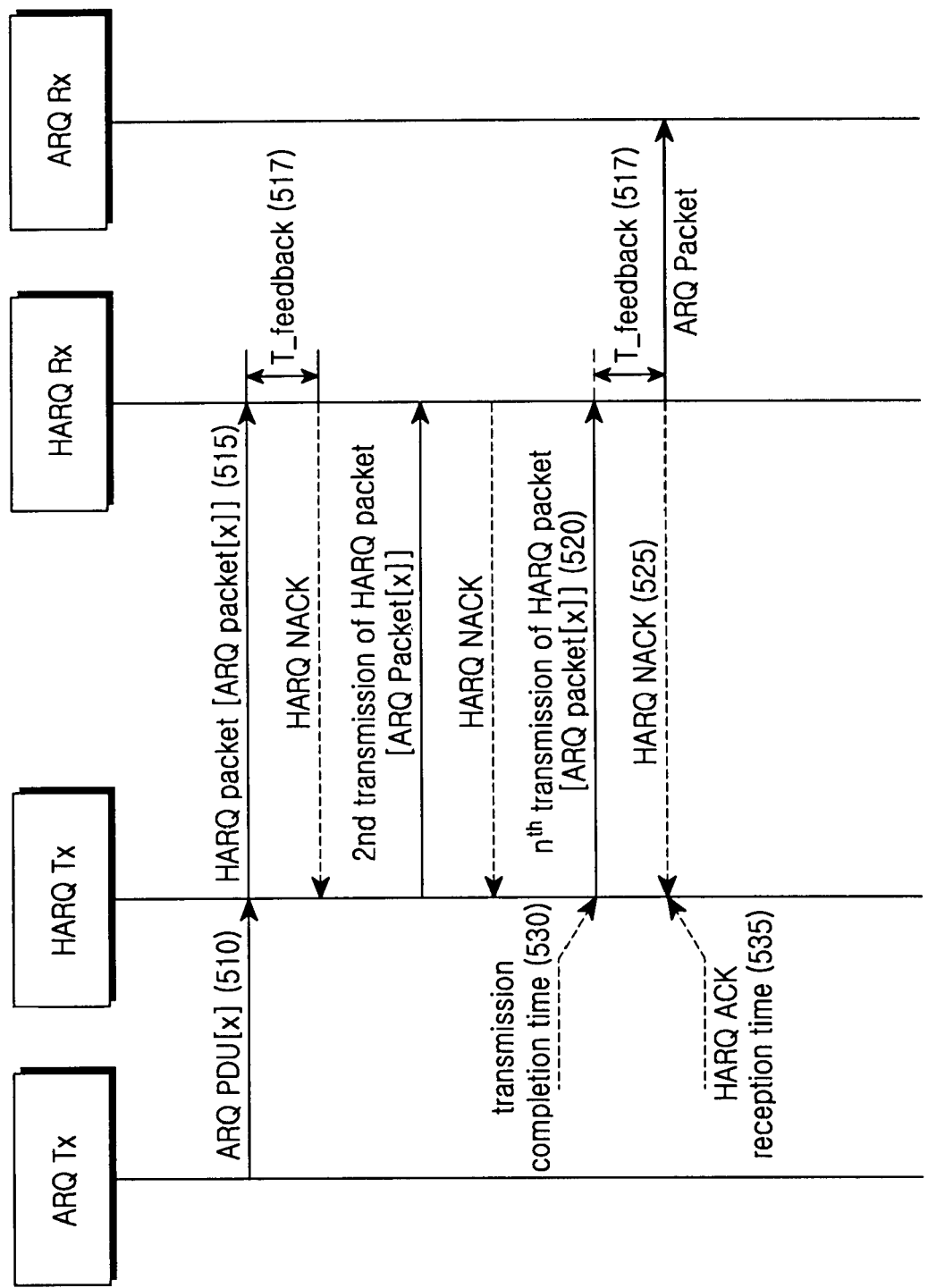
FIG. 5 is a block diagram illustrating a process of determining a transmission completion time according to a preferred embodiment of the present invention.

FIG. 5 illustrates an process in which an ARQ Tx entity recognizes a transmission completion time of an ARQ packet according to a preferred embodiment of the present invention. The time the transmission of an ARQ packet was completed is the time the transmission of an HARQ packet containing the ARQ packet was completed.

In FIG. 5, an ARQ PDU[x] 510 contained in an HARQ packet is transmitted in step 515, and the HARQ packet successfully arrives at an HARQ Rx entity through n repeated transmissions in step 520. Here, the HARQ Rx entity soft-combines the $n^{th}$-transmitted HARQ packet with the previously received same HARQ packets, checks presence/absence of error in the combined packet, and transmits an HARQ ACK signal for the HARQ packet to an HARQ Tx entity in the absence of error in step 525.

The HARQ Tx entity recognizes the completion of successful transmission for the HARQ packet at a time 535 at which it has received an HARQ ACK for the HARQ packet, and determines the time that goes ahead of the reception time 535 of the HARQ ACK by T_feedback 517, as an actual time 530 at which the HARQ packet was successfully transmitted.

For reference, a description of the T_feedback 517 will now be made. In an HARQ operation, if a transmission time of an HARQ packet and a reception time of an HARQ feedback signal are spaced apart by a specific time difference ('propagation time'+'processing time'), the time difference is referred to as the T_feedback 517 in the present invention. In the HARQ operation, because an HARQ packet and its feedback signal are related (or mapped) in the time axis, there is no need to separately specify to which HARQ packet each feedback signal is mapped.

Therefore, a transmission completion time of an HARQ packet can be calculated as follows:

'transmission completion time of *HARQ packet*'='reception time of *HARQ ACK* for *HARQ* packet'–*T*_feedback A transmission completion time of an ARQ PDU[x] is a transmission completion time of an HARQ packet containing the ARQ PDU[x]. Therefore, the HARQ Tx entity, if transmission of the HARQ packet is completed, notifies the transmission completion time of the HARQ packet to the ARQ Tx entity, and the ARQ Tx entity recognizes a transmission completion time of the ARQ packet using the transmission completion time of the HARQ packet, and uses the recognized transmission completion time in determining whether there is a need for retransmission of the ARQ packet.

A process of the ARQ Tx entity according to a preferred embodiment of the present invention will now be described in more detail.

The ARQ Tx entity, after completing transmission of an ARQ packet, records a transmission completion time of the ARQ packet. The transmission completion time of the ARQ packet is the time the last transmission of an HARQ packet including the ARQ packet was completed, and if the ARQ Tx entity retransmits the ARQ packet for some reason, the transmission completion time of the ARQ packet is updated with the time the retransmission of the ARQ packet was completed. The ARQ Tx entity, as shown in FIG. 5, recognizes the relationship between an ARQ packet and an HARQ packet containing the ARQ packet, and estimates a transmission completion time of the ARQ packet from the transmission completion time of the HARQ packet, reported by the HARQ Tx entity. That is, a transmission completion time of an HARQ packet containing an ARQ PDU[x] is a transmission completion time of the ARQ PDU[x].

Upon receipt of a status report from an ARQ Rx entity, the ARQ Tx entity operates as follows:

The ARQ Tx entity discards the ARQ packets ACK-ed by the status report, and clears the transmission completion time of the ARQ packets.

The ARQ Tx entity compares a generation time of the status report with a transmission completion time of the ARQ packets not ACK-ed by the status report, and retransmits an ARQ packet whose transmission completion time goes ahead of the generation time of the status report, among the non-ACK-ed ARQ packets.

The ARQ Tx entity retransmits the ARQ packets meeting a specific criterion, among the ARQ packets NACK-ed in the status report.

Figure 6:
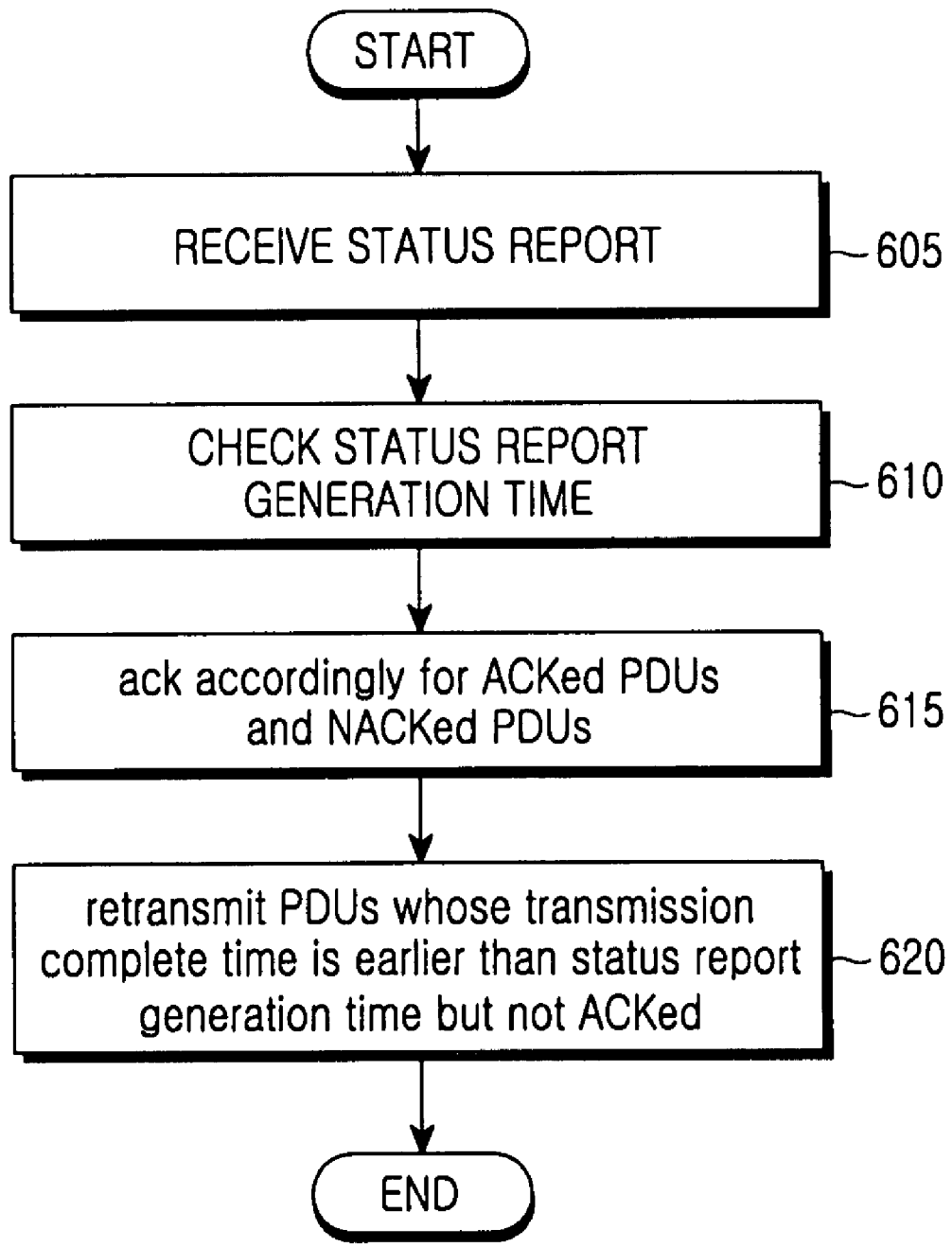
FIG. 6 is a flow diagram illustrating a detailed process of an ARQ Tx entity according to a preferred embodiment of the present invention.

FIG. 6 illustrates a detailed process of an ARQ Tx entity upon receiving a status report according to a preferred embodiment of the present invention.

In FIG. 6, an ARQ Tx entity receives in step 605 a status report from an ARQ Rx entity. In step 610, the ARQ Tx entity checks the time (status report generation time) at which the status report was generated. The status report generation time is the time the status report was generated, and can be included, for example, in the status report in the form of a timestamp. As another method, the status report generation time can be calculated. In this case, for example, the ARQ Tx entity regards, as the status report generation time, the time at which an HARQ packet containing the status report was initially received at an HARQ Rx entity.

In step 615, the ARQ Tx entity analyzes an ACK signal and a NACK signal contained in the status report, and takes an appropriate action according thereto. For example, the ARQ Tx entity discards the ACK-ed ARQ packets from a retransmission buffer, and then clears the transmission completion time.

In step 620, the ARQ Tx entity determines whether there are ARQ packets not ACK/NACK-ed in the status report, among the ARQ packets having the transmission completion time going ahead of the status report generation time, and retransmits the detected ARQ packets. If a certain ARQ packet is not ACK/NACK-ed in the status report, it means that neither an ACK signal nor a NACK signal for the ARQ packet is included in the status report.

Figure 7:
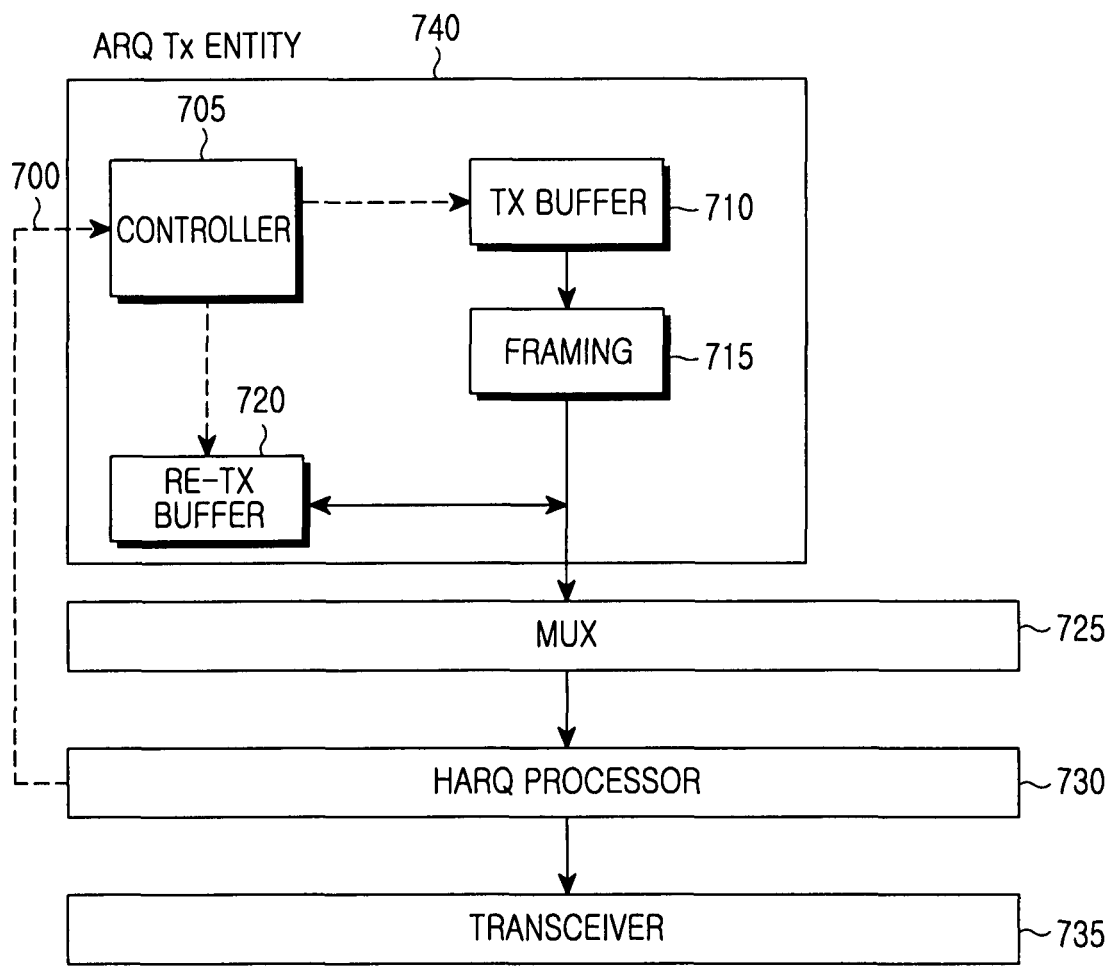
FIG. 7 is a block diagram illustrating a structure of an ARQ Tx entity according to a preferred embodiment of the present invention.

FIG. 7 illustrates a structure of an ARQ Tx entity according to a preferred embodiment of the present invention. As illustrated, an ARQ Tx entity 740 includes a controller 705, a transmission buffer 710, a framing unit 715, and a retransmission buffer 720.

In FIG. 7, the ARQ Tx entity 740 is connected to a multiplexer 725, and the multiplexer 725 multiplexes the ARQ packets delivered from a multiple ARQ Tx entity including the ARQ Tx entity 740, into one HARQ packet. An HARQ processor 730 controls transmission of the HARQ packet through a specific HARQ process. The HARQ process in the HARQ Tx entity refers to a process of transmitting an HARQ packet, determining whether an ACK/NACK signal for the HARQ packet is received, and then retransmits/discards the HARQ packet according to determination result. A transceiver 735 modulates the HARQ packet into a radio signal before transmission, and delivers an HARQ packet obtained by demodulating a received radio signal, to the HARQ processor 730.

A process of the ARQ Tx entity 740 will now be described in more detail.

A packet generated in an upper layer is stored in the transmission buffer 710. The upper layer packet is framed in an appropriate size by the framing unit 715, configured into an ARQ packet with necessary header information including a sequence number inserted therein, and then delivered to the multiplexer 725. Here, a copy of the ARQ packet is stored in the retransmission buffer 720.

The controller 705 receives from the HARQ processor 730 a transmission completion time 700 of an HARQ packet containing the ARQ packet, and calculates a transmission completion time of the ARQ packet using the transmission completion time 700. In addition, the controller 705 receives a status report transmitted by an ARQ Rx entity (not shown) from the HARQ processor 730, analyzes the received status report, and controls transmission/deletion of the data in the transmission buffer 710 and the retransmission buffer 720 depending on the analysis result. In particular, the controller 705 compares a generation time of the status report with a transmission completion time of the ARQ packets, and controls the retransmission buffer 720 so as to output, for retransmission, the ARQ packets which are not ACK-ed by the status report even though their transmission was completed.

As is apparent from the foregoing description, in the system where HARQ and ARQ operate together, the present invention performs retransmission on the transmission failure that the ARQ Rx entity has failed to recognize, thereby contributing to a reduction in the retransmission delay.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for performing Automatic Retransmission reQuest (ARQ) in a mobile communication system including an ARQ layer and a Hybrid ARQ (HARQ) layer, the method comprising:
   receiving from an ARQ receiving (Rx) entity a status report indicating a reception status of ARQ packets;
   detecting an ARQ packet having a transmission completion time going ahead of a generation time of the status report, among the ARQ packets whose transmission was completed by an ARQ transmitting (Tx) entity; and
   retransmitting an ARQ packet not ACK/NACK-ed by the status report, among the detected ARQ packets.

2. The method of claim 1, further comprising:
   acquiring a generation time of the status report from a timestamp included in the status report.

3. The method of claim 1, further comprising:
   determining, as a generation time of the status report, a time at which an HARQ packet containing the status report was initially received.

4. The method of claim 1, further comprising:
   discarding the ARQ packets ACK-ed by the status report, and clearing a transmission completion time of the ACK-ed ARQ packets; and
   retransmitting the ARQ packets NACK-ed by the status report.

5. The method of claim 1, wherein the status report includes the sequence numbers of the ARQ packets successfully received up to a generation time of the status report, and the sequence numbers of the ARQ packets reception-failed up to the generation time of the status report.

6. An apparatus for performing Automatic Retransmission reQuest (ARQ) in a mobile communication system including an ARQ layer and a Hybrid ARQ (HARQ) layer, the apparatus comprising:
   a framing unit for generating ARQ packets by framing a packet from an upper layer;
   a retransmission buffer for storing copies of the ARQ packets for transmission thereof;
   a multiplexer for multiplexing the ARQ packets into an HARQ packet;
   an HARQ processor for transmitting the HARQ packet according to an HARQ process, and recording a transmission completion time of the HARQ packet;
   a transceiver for modulating the HARQ packet into a radio signal before transmission, and demodulating the HARQ packet, received from an ARQ receiving (Rx)

entity, including a status report indicating a reception status of the ARQ packets; and a controller for detecting an ARQ packet having a transmission completion time going ahead of a generation time of the status report, among the ARQ packets stored in the retransmission buffer, and controlling the retransmission buffer so as to output an ARQ packet not ACK/NACK-ed by the status report, among the detected ARQ packets.

7. The apparatus of claim 6, wherein the controller acquires a generation time of the status report from a timestamp included in the status report.

8. The apparatus of claim 6, wherein the controller determines, as a generation time of the status report, a time at which an HARQ packet containing the status report was initially received.

9. The apparatus of claim 6, wherein the controller:

discards the ARQ packets ACK-ed by the status report from the retransmission buffer, and clears a transmission completion time of the ACK-ed ARQ packets; and controls the retransmission buffer so as to output the ARQ packets NACK-ed by the status report.

10. The apparatus of claim 6, wherein the status report includes the sequence numbers of the ARQ packets successfully received up to a generation time of the status report, and the sequence numbers of the ARQ packets reception-failed up to the generation time of the status report.

* * * * *